(12) United States Patent
Mizuno et al.

(10) Patent No.: US 6,560,819 B2
(45) Date of Patent: May 13, 2003

(54) WATER-PROOF GROMMET

(75) Inventors: Hiromichi Mizuno, Aichi (JP); Hisashi Ito, Aichi (JP); Ryuji Utsuno, Aichi (JP)

(73) Assignee: Aoyama Seisakusho Co., Ltd., Aichi-ken (JP)

( * ) Notice: Subject to any disclaimer, the term of this patent is extended or adjusted under 35 U.S.C. 154(b) by 0 days.

(21) Appl. No.: 09/823,164

(22) Filed: Mar. 30, 2001

(65) Prior Publication Data

US 2001/0027588 A1 Oct. 11, 2001

(30) Foreign Application Priority Data

Apr. 3, 2000 (JP) .......................................... 2000-100861

(51) Int. Cl.$^7$ ................................................. F16L 5/02
(52) U.S. Cl. .............................. 16/2.2; 16/2.1; 411/182; 411/508
(58) Field of Search ................... 16/2.1, 2.2; 174/65 G, 174/152 G, 153 G; 411/182, 508, 913, 509, 510, 371.1; 248/56

(56) References Cited

U.S. PATENT DOCUMENTS

| | | | | |
|---|---|---|---|---|
| 3,351,974 A | * | 11/1967 | Wilhelmi | 16/2.1 |
| 3,701,302 A | * | 10/1972 | Pestka et al. | 411/15 |
| 3,701,373 A | | 10/1972 | Wronke et al. | |
| 3,836,269 A | * | 9/1974 | Koscik | 16/2.2 |
| 4,077,300 A | * | 3/1978 | Yoda | 411/15 |
| 4,137,602 A | * | 2/1979 | Klumpp, Jr. | 16/2.1 |
| 4,324,503 A | * | 4/1982 | Sevrence | 16/2.1 |
| 4,358,234 A | * | 11/1982 | Takegawa et al. | 411/182 |
| 4,407,042 A | * | 10/1983 | Schramme et al. | 16/2.1 |
| 4,739,543 A | | 4/1988 | Harris, Jr. | |
| 4,784,550 A | * | 11/1988 | Wollar | 411/32 |
| 4,887,331 A | * | 12/1989 | Thomas | 16/2.1 |
| 4,901,395 A | * | 2/1990 | Semrau | 16/2.2 |
| 4,906,152 A | * | 3/1990 | Kurihara | 174/138 D |
| 4,927,306 A | * | 5/1990 | Sato | 411/182 |
| 5,106,225 A | * | 4/1992 | Andre et al. | 403/297 |
| 5,203,051 A | * | 4/1993 | Tonami et al. | 16/2.1 |
| 5,294,225 A | | 3/1994 | Kazino et al. | |
| 5,429,467 A | * | 7/1995 | Gugle et al. | 411/182 |
| 5,507,610 A | * | 4/1996 | Benedetti et la. | 24/297 |
| 5,738,476 A | | 4/1998 | Assimakopoulos | |

FOREIGN PATENT DOCUMENTS

| | | | |
|---|---|---|---|
| GB | 2316707 | | 3/1998 |
| JP | 62-22659 | | 6/1987 |
| JP | 165133 | * | 6/2001 |

* cited by examiner

*Primary Examiner*—Chuck Y. Mah
(74) *Attorney, Agent, or Firm*—Frishauf, Holtz, Goodman & Chick, P.C.

(57) ABSTRACT

A water-proof grommet is provided which includes a plate-shaped head, a polygonal grommet body, and at least two latch pawls connected at lower ends to the grommet body and arranged on an outside surface of a substantially central portion of the grommet body. The head is substantially flat at a back surface thereof, and the latch pawls are provided at tip end portions with at least one inclined surface inclined outward and downward from the grommet body and at least one adjacent flat portion. The grommet body is adapted to expand radially as a screw is threaded therein, so as to cause an outer surface of the grommet body to deform the latch pawls radially outward and thereby cause at least one of the inclined surface and the adjacent flat portion of the latch pawls to press a member being mounted toward the back surface of the head.

3 Claims, 5 Drawing Sheets

Fig. 6
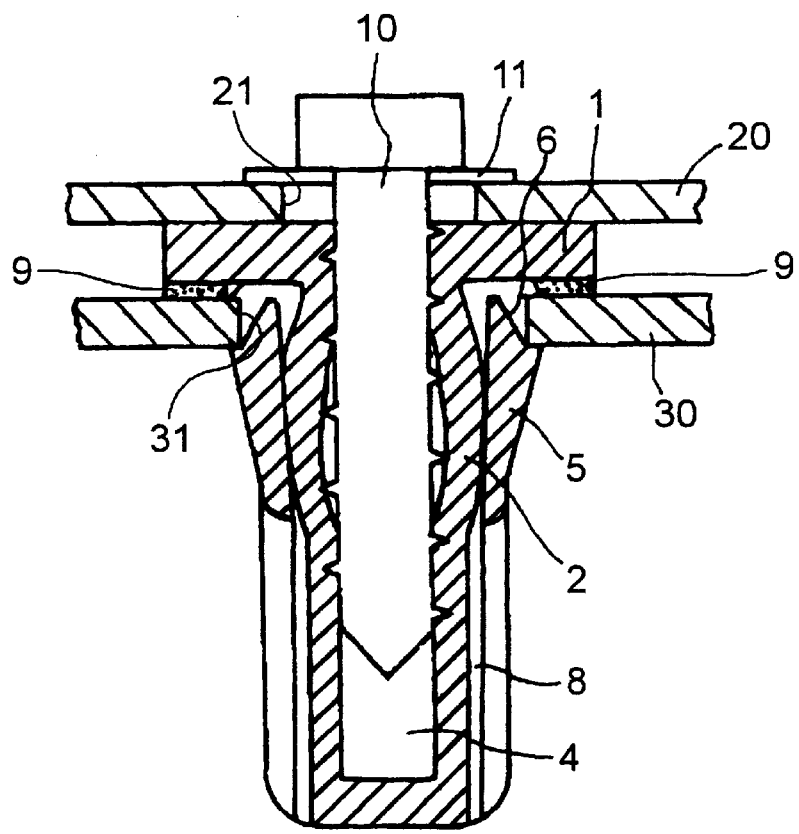
Fig. 7A    Fig. 7B    Fig. 7C    Fig. 7D
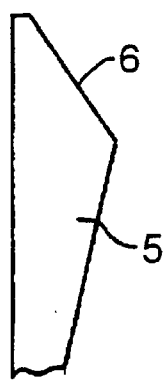 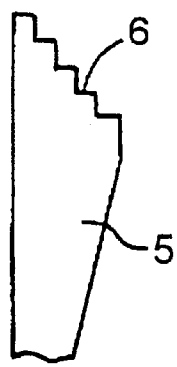 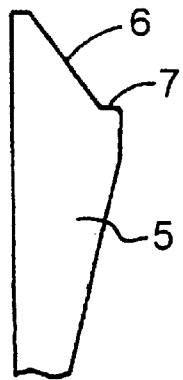 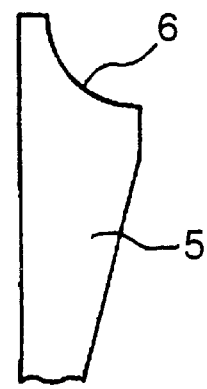

WATER-PROOF GROMMET

BACKGROUND OF THE INVENTION

The invention relates to an improvement in water-proof grommets of synthetic resin used in mounting small parts or the like to a member being mounted, such as body steel-sheet of automobiles.

Water-proof grommets of synthetic resin having a body in the form of a bottomed cylinder for prevention of entrance of rain water or the like are disclosed in Japanese Utility Model Publication No. 22659/1987 filed by the applicant of the present application. FIG. 8 is a cross sectional view showing a water-proof grommet described in the above publication, which grommet is provided with short, upward latch pawls 41 on both sides of an upper portion of a grommet body 40, and a neck 43 below a head 42. A falling-off preventing effect is obtained by inserting the grommet body 40 into a mount hole 31, which is formed in a member being mounted 30, such as body steel-sheet, while flexing the latch pawls 41 inward, and then threading a screw, for example, a tapping screw, into a lumen of the grommet body 40 to expand the grommet body 40 outward to bring the neck 43 into close contact with an inner edge of the mount hole 31 of the member being mounted 30.

With such grommet, however, when the grommet body 40 is intensely pulled upward, tips of the latch pawls 41 abut against a back surface of the member being mounted 30 to exhibit the falling-off preventing effect of the entire grommet body 40 but the tips of the latch pawls 41 are in a free state (engagement is not present between the tips and an underside of the member being mounted) when the grommet body 40 is inserted into the mount hole 31 or when a screw is threaded into the lumen of the grommet body 40. Accordingly, the entire grommet is made axially movable depending upon a thickness of the member being mounted 30. Also, there is involved a problem that since the latch pawls 41 are short, a force (hereinafter referred to as insertion load) required for insertion of the grommet body 40 into the mount hole 31 is great and so the insertion is not easy.

SUMMARY OF THE INVENTION

The invention has been contrived to solve the above-mentioned problems of the prior grommets and to provide a water-proof grommet in which insertion load can be reduced further than those of the prior grommets and which prevents the possibility that the entire grommet will be moved axially irrespective of the thickness of a member being mounted.

The water-proof grommet according to the invention comprises a head provided with an insertion hole, and a grommet body provided below the head to be capable of expanding outward as a screw adapted to be threaded into a central hole contiguous to the insertion hole advances. The water-proof grommet also includes at least two latch pawls which are connected at lower ends thereof to the grommet body and which are arranged on an outside surface of a substantially central portion of the grommet body in a longitudinal direction. At least portions of inside surfaces of tip ends of the latch members are adapted to be pushed by the outside surface of the grommet body when the grommet body expands outward, and inclined surfaces formed on upper surfaces of the tip ends of the latch pawls are inclined outward and downward. The inclined surfaces push a member being mounted in an upward direction and an upper surface of the member being mounted is brought into close contact with a flat back surface of the head when the latch pawls are pushed outward due to expansion of the grommet body.

In addition, the inclined surfaces can assume various configurations, for example, generally straight, stepped, steps formed at lower portions thereof, and generally curved.

With the water-proof grommet according to the invention, since upper surfaces of tip ends of the latch pawls include inclined surfaces inclined outward and downward, portions of the inclined surfaces always contact with and push a member being mounted whenever a screw is threaded into a lumen of the grommet body, even if the member being mounted is different in thickness. Therefore, irrespective of thickness of the member being mounted, there is no possibility that the entire grommet can move axially. Also, since lower ends of the latch pawls are connected to a substantially central portion of the grommet body, adequate elasticity is ensured for the latch pawls with the result that load at which the grommet body is inserted into the member being mounted can be reduced further than with the prior grommets.

BRIEF DESCRIPTION OF THE DRAWINGS

FIG. 6 is a cross sectional view showing a state, in which the water-proof grommet of FIG. 1 has been completely mounted in the case where a member being mounted is thick.

FIGS. 7A, 7B, 7C and 7D are enlarged views showing various embodiments of inclined surfaces.

DESCRIPTION OF THE PREFERRED EMBODIMENTS

The invention will be described below in details with reference to the accompanying drawings, in which an embodiment is shown.

Figure 1:
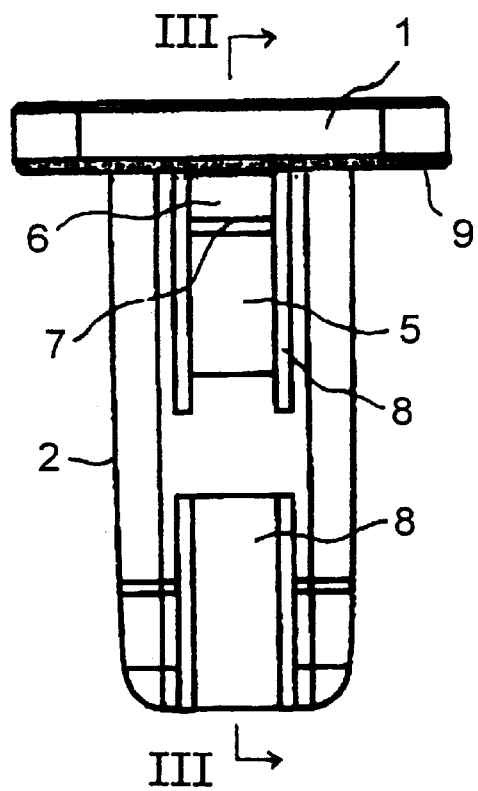
FIG. 1 is a front view showing an embodiment of a water-proof grommet according to the invention.
Figure 2:
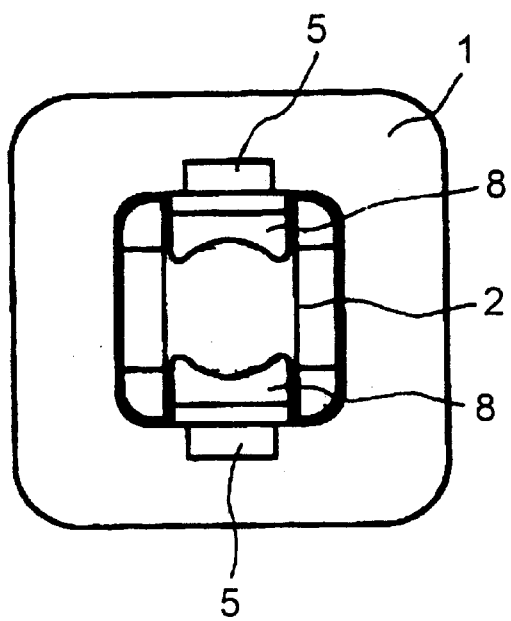
FIG. 2 is a bottom view showing the water-proof grommet of FIG. 1.
Figure 3:
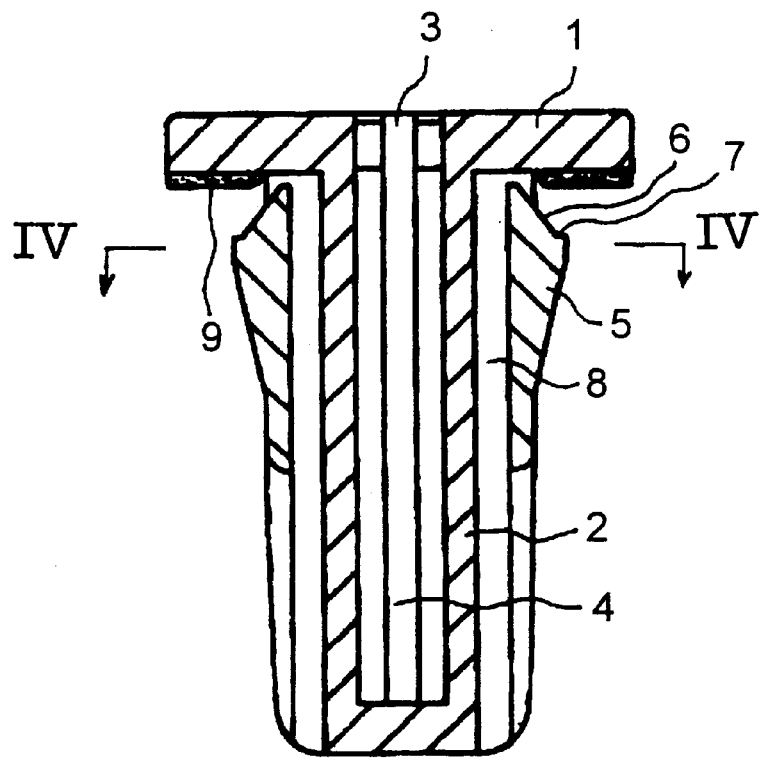
FIG. 3 is a cross sectional view taken along the line III—III in FIG. 1.
Figure 4:
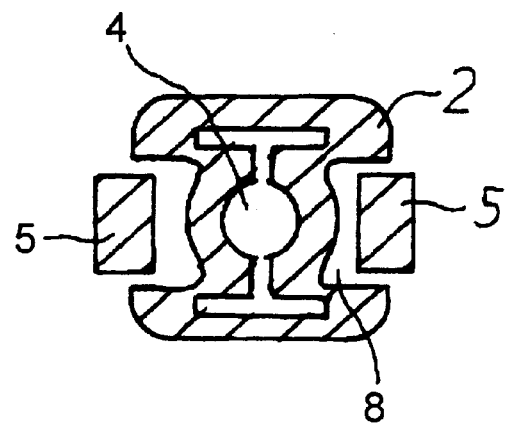
FIG. 4 is a cross sectional view taken along the line IV—IV in FIG. 3.
Figure 5:
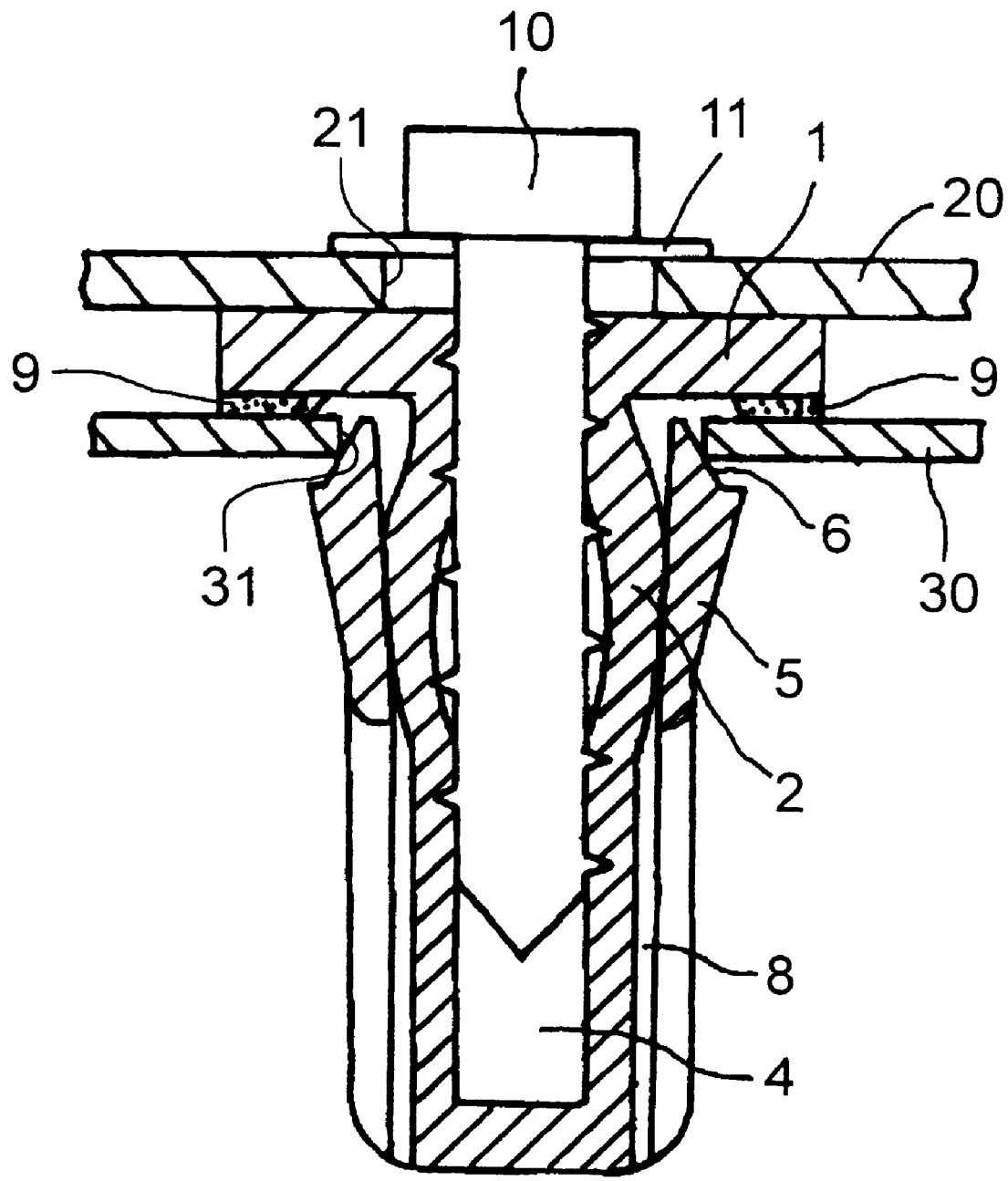
FIG. 5 is a cross sectional view showing a state, in which the water-proof grommet of FIG. 1 has been completely mounted in the case where a member being mounted is thin.
Figure 8:
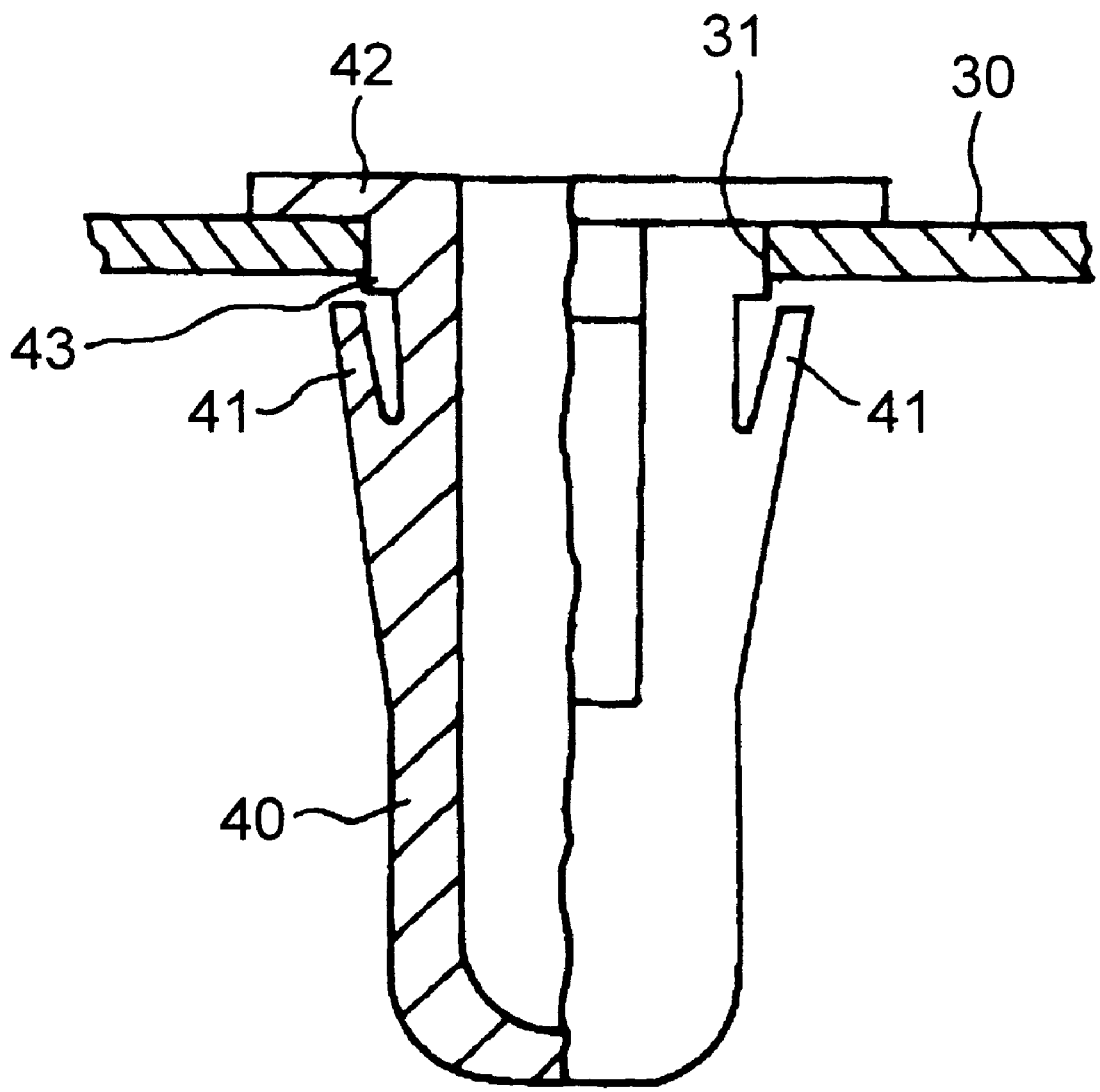
FIG. 8 is a cross sectional view showing a prior grommet.

In these drawings, the reference numeral 1 designates a plate-shaped head, and 2 a grommet body arranged under the head 1 to be square in external form, these elements being generally formed and manufactured with a hard synthetic resin, such as polyamide resin, polypropylene, polyacetal or the like, of a proper elasticity. Formed centrally of the head 1 is an insertion hole 3 (its diameter being smaller by 50–60% than an outer diameter of a screw) permitting a screw 10, such as a tapping screw (for example, made of carbon steel) to be inserted therethrough under a proper load, and also formed centrally of the grommet body 2 is a central hole 4 (not extending through the grommet body 2) contiguously communicated to the insertion hole 3 to have the same diameter as that of the insertion hole. As shown in FIGS. 5 and 6 (oblique lines indicative of cross section being not drawn on the screw 10 for avoiding difficulty in seeing), reaction forces produced when the screw 10 such as a tapping screw is threaded into the central hole 4 from the insertion hole 3 causes the grommet body 2 to expand radially while being pulled upward toward the head 1 (the reference numeral 11 designates a washer).

Lower ends of latch pawls 5 are connected to substantially central, outer sides of the grommet body 2. In addition, while the latch pawls 5 in the embodiment shown are two in number, they may correspondingly be provided on all the sides, that is, four in number in this case. Also, an external shape of the grommet body shown is square but may be polygonal including a pentagonal shape. However, as the external shape resembles a circle, there is increased the possibility that the grommet rotates on its axis. So, there is caused the need of an arrangement for prevention of rotation, in which concave and convex portions engageable with each other are provided on upper surfaces of tip ends of the latch pawls 5 and on a member being mounted to be disposed in corresponding positions, respectively. It suffices to determine an appropriate one of polygonal shapes in view of manufacturing cost. The latch pawls 5 extend toward the back surface of the head 1 from substantially central, outer sides of the grommet body 2, and upper halves of the latch pawls 5 expand outward as shown in the figures. Also, upper surfaces of tip ends of the latch pawls 5 include inclined surfaces 6 which are inclined outward and downward. The inclination is not specifically limitative but may be sufficient to enable permitting at least portions of the inclined surfaces 6 to contact with and press upward against the member 30 being mounted. In addition, contact positions between the inclined surfaces 6 and the member being mounted 30 are determined in accordance with a thickness of the member being mounted 30. In addition, inner sides and sides of the latch pawls 5 form a continuous cavity 8 in order to provide the latch pawls 5 with elasticity, which is required when the grommet is inserted through the member being mounted 30. Besides, in the embodiment shown, a flat-plate shaped seal rubber 9 is provided on an underside of the head 1 to provide the grommet with the water-proof function.

Also, the inclined surfaces 6 may include small steps 7 (see FIG. 7C) on lower portions thereof, or the inclined surfaces 6 may be generally straight (see FIG. 7A), generally stepped (see FIG. 7B), or generally curved (see FIG. 7D).

With the water-proof grommet of the invention thus formed, the grommet body 2 is expanded radially outward by inserting the grommet into the mount hole 31, which is formed in the member being mounted 30, until upper ends of the latch pawls 5 reach the back surface of the member being mounted 30, and inserting the screw 10, such as a tapping screw, which is inserted through a mount hole 21 of a mounting member 20 and on an underside of a head of which a washer 11 is mounted, into the central hole 4 from the insertion hole 3. As a result, being pushed by the grommet body 2 having been expanded as shown in FIGS. 5 and 6, the latch pawls 5 are caused to deform outward to rigidly engage the grommet body 2 with the member being mounted 30, and simultaneously the mounting member 20 is mounted to the member being mounted 30, with an upper surface of the head 1 of the grommet body 2 therebetween. In addition, since lower ends of the latch pawls 5 are connected to the grommet body 2 at a substantially central portion of an outer surface of the grommet body 2 and since the latch pawls 5 are large in length (from the lower ends to the tip ends) as compared with the prior grommets, elasticity is adequately ensured with the result that it is possible to reduce the insertion load more than with the prior grommets.

In this manner, in a state, in which the water-proof grommet of the invention is inserted into the mount hole 31 of the member being mounted 30 and the screw is threaded into the central hole 4, an edge of the mount hole 31 on a back surface abuts against upper portions of the inclined surfaces 6 formed on upper surfaces of tip ends of the latch pawls 5 as shown in FIG. 5 in the case where the member being mounted 30 is small in plate thickness, while the edge of the mount hole 31 on the back surface abuts against the lower portions of the inclined surfaces 6 formed on the upper surfaces of the tip ends of the latch pawls 5 as shown in FIG. 6 in the case where the member being mounted 30 is large in plate thickness, in either of which the latch pawls 5 push up the member being mounted 30, to bring the same into close contact with the back surface of the head 1 of the grommet (actually, reaction forces produced when the latch pawls push up the member being mounted 30 deform the grommet itself downward, so that the back surface of the head is intensely brought into close contact with an upper surface of the member being mounted 30).

In this manner, the grommet of the invention always enables portions of the inclined surfaces 6 formed on the upper ends of the latch pawls 5 to contact with the edge of the mount hole 31 on the back surface of the member being mounted 30 even when the member being mounted 30 is varied in plate or sheet thickness. In a state, in which threading of the screw has been completed, the latch pawls 5 are intensely pushed outward to have the inclined surfaces 6 thereof pushed against the member being mounted 30, so that it is not possible that the water-proof grommet moves axially relative to the member being mounted 30 unlike prior grommets.

Besides, sure water-proof performance can be obtained since the bottomed configuration of the grommet body 2 eliminates the possibility of invasion of water therethrough and the seal rubber 9 provided on the underside of the head 1 contacts closely with the member being mounted 30 to seal a periphery of the mount hole 31 of the member being mounted 30.

As described above, the water-proof grommet of the invention has advantages that the grommet is not moved axially once being engaged since the portions of the inclined surfaces formed on the tip ends of the latch pawls always contact with and push against the member being mounted, and that load upon insertion of the grommet into the mount hole of the member being mounted can be reduced since the latch pawls posses adequate elasticity.

What is claimed is:

1. A water-proof grommet comprising:
   a plate-shaped head having a predetermined thickness, a front surface, and a flat back surface,
   a square grommet body extending from the back surface of the head in a thickness direction of the head,
   at least two latch pawls which are connected to outer surfaces of the grommet body at a substantially central portion of the grommet body in a longitudinal direction,
   wherein an insertion hole is provided in a substantially central portion of the head, and a central hole communicating with the insertion hole is provided in a substantially central portion of the grommet body interposed between the at least two latch pawls,
   wherein each of the latch pawls comprises a tip end portion having an inner edge opposed to the grommet body and an outer edge located outward relative to the inner edge, wherein an inclined surface is provided at the tip end portion of each of the latch pawls, and the inclined surface is inclined away from the head from the inner edge toward the outer edge of the tip end portion of each of the latch pawls, wherein the grommet body is adapted to expand radially as a screw is threaded into the central hole of the grommet body so as to expand the grommet body radially outward and cause the outer surfaces of the grommet body to apply an outward pushing force to the latch pawls and thereby cause the tip end portions of the latch pawls to be displaced radially outward and toward the head.

2. The water-proof grommet according to claim 1, wherein a flat portion is formed between the inclined surface and the outer edge of the tip end portion of each of the latch pawls, and the flat portion is substantially parallel to the flat back surface of the head.

3. The water-proof grommet according to claim 1, wherein the grommet body is formed of an elastic material.

* * * * *